United States Patent [19]

Markle

[11] 4,181,017
[45] Jan. 1, 1980

[54] FAULT DETECTING APPARATUS FOR FLUID PRESSURE SYSTEMS

[76] Inventor: Charles R. Markle, 12242 McDaniel, Alsip, Ill. 60658

[21] Appl. No.: 931,611

[22] Filed: Aug. 7, 1978

[51] Int. Cl.$^2$ ............................ G01F 1/20; G01L 7/00
[52] U.S. Cl. ........................................ 73/168; 137/489
[58] Field of Search ................ 73/168; 137/489, 492.5

[56] References Cited
U.S. PATENT DOCUMENTS

| | | | |
|---|---|---|---|
| 2,392,951 | 1/1946 | Salisbury | 73/168 X |
| 3,250,293 | 5/1966 | Adams et al. | 137/489 X |
| 3,545,887 | 12/1970 | Kobnick | 137/492.5 X |
| 3,765,448 | 10/1973 | Dussia | 137/553 |
| 3,857,282 | 12/1974 | Dooeley et al. | 73/168 |
| 4,087,073 | 5/1978 | Runberg et al. | 137/489 X |

*Primary Examiner*—Daniel M. Yasich
*Attorney, Agent, or Firm*—Hill, Van Santen, Steadman, Chiara & Simpson

[57] ABSTRACT

A fluid pressure operated system adapted to identify malfunctioning components in the system with pressure and flow indicating devices incorporated in the system to continuously monitor fluid volume and pressure. Further, each control or regulating component utilized in the system, as well as rotary or linear motion producing components are provided with shut-off valves, which are operable to selectively isolate any component from the rest of the fluid system. Accordingly, by isolating in turn each component from the rest of the system and observing fluid pump output and pressure, a faulty component is easily identified for replacement or repair. In a hydraulic system the pressure and flow indicating devices are incorporated in the system's relief valve. The flow indicating device having a calibrated end portion externally visible, rests on the valve spool and accordingly signals the spool position relative to the valve seat to provide an accurate indication of hydraulic fluid by-passing to tank.

9 Claims, 6 Drawing Figures

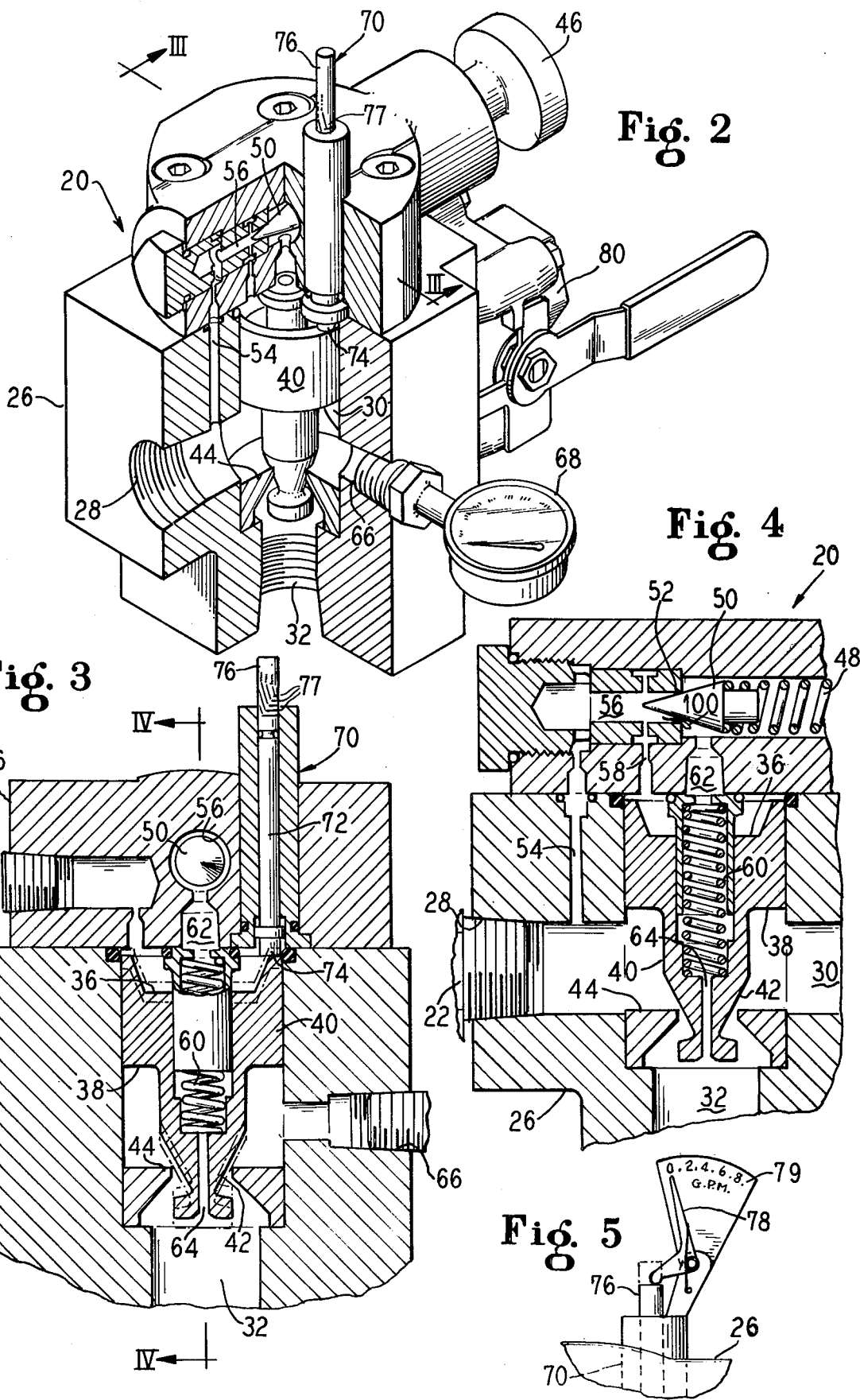

FAULT DETECTING APPARATUS FOR FLUID PRESSURE SYSTEMS

BACKGROUND OF THE INVENTION

1. Field of the Invention

This invention relates to a fluid pressure operated system and more particularly to a fluid pressure operated system having incorporated therein a means to identify malfunctioning components utilized in the system.

2. Prior Art

Fluid pressure operated systems, while very desirable for the control and operation of a wide variety of machines, require numerous complex and costly components such as pumps, valves, fluid motors, cylinders, and the like, which can be troublesome and generally require substantial maintenance. Further, these components are extremely vulnerable to problems when operating in dirty environments as is frequently the case, especially in fluid systems utilized with mining, construction, or factory equipment. While every effort may be made to keep contaminants out of the pressure systems by the use of filters, strainers and other fluid conditioning devices, dirt, decomposed packing, sludge, rust, pipe compound, etc., or even leaks in the system sooner or later are encountered with a resulting disruption in operation.

When problems occur, the usual "trouble shooting" routine requires a "change out" of a suspected component. If this fails to solve the problem other components are in turn replaced, until the faulty component is found.

Some malfunctioning components, as for example a sticking valve, may be extremely difficult to identify and often require many hours to trace down.

Herein, a small fragment of dirt may wedge between the valve poppet and its seat, allowing a portion or all of the fluid to be diverted from its working pressure port to the reservoir. In fact, the operation of any moving part may be affected by obstructions or improper seating between related elements. Further, internal leakage in actuating cylinder or operating valves due to damaged seals or packing or scored cylinder walls may go undetected for some time, with a resulting reduction in the operating efficiency of the machinery involved.

A more sophisticated method of "trouble shooting" a hydraulic system involves a somewhat complex instrumentation arrangement or test stand to which the pump of a malfunctioning circuit is connected after it is first disconnected from its own system. Pressure and volume of the pump are checked by this instrumentation system to determine if the pump is performing properly. If no problem is found in the pump's operation, the relief valve is removed from the faulty circuit and connected into the instrumentation system at the output side of the pump and tested. If the pump and relief valve function properly, each of the fluid pressure system components in turn must be checked until the culprit is found. Thus, apart from the time required to disconnect each of the components from the malfunction fluid circuit and connecting it to the instrumentation system for checking, the numerous breaks in the fluid system piping may foster new difficulties, especially in dirty environments with the entrance of foreign particulate material into the fluid systems. This can result in further difficulty in the system even after the original malfunctioning component is repaired.

It would therefore be a decided advance in the state of the art to provide a fault detecting apparatus for use with fluid pressure systems which would not only indicate major problems in a machine system but would also recognize minor malfunctions and provide a quick and efficienct means to locate the components which are causing the trouble.

SUMMARY OF THE INVENTION

My invention overcomes the disadvantages of the prior art and provides a fault detecting apparatus to identify a specific malfunctioning component utilized in a machine fluid pressure operated system without removing the components from the system and which may be continuously used to recognize even minor malfunctions in the fluid system. This apparatus provides a simple, yet effective way for first recognizing a problem exists and then enabling the defective component to be traced and identified. Herein, virtually each component utilized in a machine fluid circuit is provided with a blocking valve enabling every portion of a fluid pressure system to be isolated from the rest of the system. Further, a pressure registering device and a full time flow indicator are provided to continuously monitor the fluid system. It is not generally advisable to provide a conventional flow meter in a machine using a hydraulic pressure system since such meters are not well suited to continuous use and could soon cause problems themselves if used, especially with high pressures and high flow rates associated with hydraulic systems. A novel flow indicator is provided which is not subject to problems associated with prior flow meters, and which is incorporated into the system's relief valve to effectively monitor hydraulic fluid diverted to the hydraulic reservoir. Thus, by closing off each of the blocking valves in turn, every portion of the circuit and each valve and cylinder, etc., may be individually checked for a malfunction. Further, this is easily and quickly done without additional test equipment or the "changing out" of components as in the past.

It is therefore an object of this invention to provide an integral fault detecting apparatus for a fluid pressure system which indicates that a malfunction exists in the system and enables the defective component to be identified.

It is another object of this invention to provide an integral fault detecting apparatus for a fluid pressure system having a novel flow indicator suitable for continuous use in a high pressure, high volume hydraulic system.

It is yet another object of this invention to provide a fault detecting apparatus in a fluid pressure system having a pressure and volume indicator and providing each fluid system component with a blocking valve to isolate any component from the rest of the system to identify a specific defective component in the system.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 2 is an isometric view, in section, of the combination relief valve and trouble shooting device shown in FIG. 1.

FIG. 3 is a sectional view taken generally along the line III—III of FIG. 2.

FIG. 4 is a sectional view taken generally along the line IV—IV of FIG. 3.

FIG. 5 is a fragmentary view of a modified fluid flow indicating device; and

DETAILED DESCRIPTION OF THE INVENTION

Figure 1:
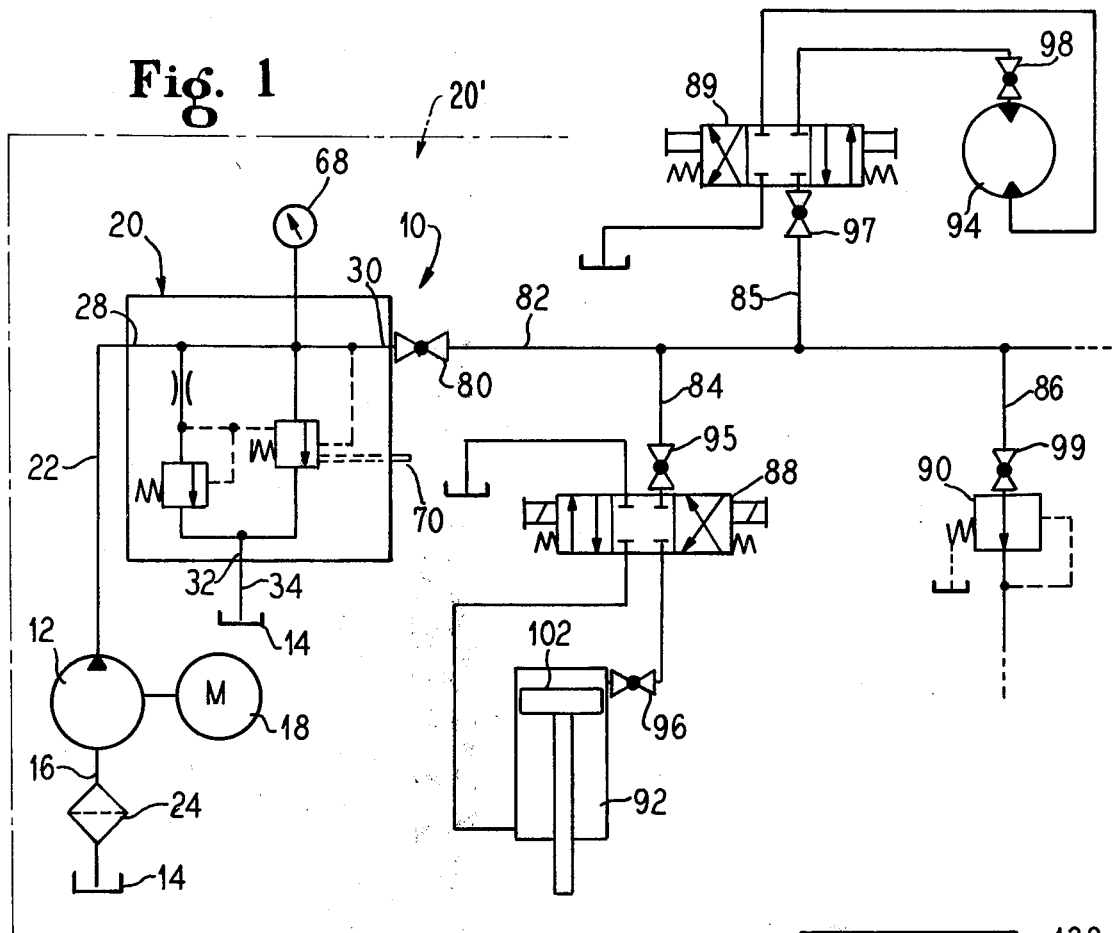
FIG. 1 is a schematic circuit diagram showing the fault detecting apparatus of this invention utilized with a hydraulic pressure system.

FIG. 1 illustrates a portion of a typical hydraulic circuit arrangement which may be used to power and control functions of a machine 20' (not detailed) generally indicated by broken lines and having a fault detecting apparatus 10 incorporated therein. A pump 12, connected to an oil reservoir 14 by an intake line 16 and driven by a motor 18 delivers a given volume of oil to a combination relief valve and trouble shooting device 20 through a pressure line 22 in accordance with the capacity of the pump. The combination relief valve and trouble shooting device 20 is a part of the machine 20' and the fluid pressure system operating various elements of the machine. A filter element 24 in the intake line 16 strains the oil going to the pump to minimize the possibility of foreign particulate matter passing through the system. Said hydraulic circuit including the components are herein termed a fluid pressure operated system.

As best seen FIGS. 2 and 4, the relief valve and trouble shooting device 20, which is of a balanced spool type, includes a valve body 26 having an inlet port 28, an outlet pressure port 30 and an outlet tank or drain port 32. The outlet drain port 32 is connected back to the reservoir 14 by a drain line 34. The relief function of the device 20 is of conventional operation with pressure forces being balanced on opposite ends 36 and 38 of a valve spool 40. The lower end of the valve spool 40 includes a cone portion 42 normally pressing against a valve seat 44 when the device 20 is operating below the pressure relief setting. The pressure setting is adjustably controlled by a conventional screw adjustment 46 which sets the biasing pressure of a spring 48 which forces a cone 50 against a seat 52. A restricted passageway 54 in the valve body 26 communicates with a pressure chamber 56. Fluid pressure in the chamber 56 reacts against the cone 50 in opposition to the spring 48. A second restricted passageway 58 provides pressure communication between chamber 56 and the upper valve spool end 36. In normal operation a spool spring 60 is effective to hold the spool 40 closed against the seat 44 with the valve spool ends 36 and 38 having substantially equal hydraulic pressures thereagainst. When excessive pressures develop in the system, i.e., above the pressure adjustment set by the screw 46, the spring 48 yields to allow the cone 50 to move away from its seat 52 with a resulting momentary flow of oil to the reservoir 14 by way of a drain passage 62, through a spool passage 64 to outlet drain port 32 and the drain line 34. This condition suddenly reduces the pressure in chamber 56 and accordingly at the upper valve spool end 36 with a related increase at the lower end 38 of the valve spool 40, since the restricted passageways 54 and 58 do not allow free equalizing pressure flow therethrough. With higher pressure acting on the lower end 38 (see FIG. 3) the valve spool moves away from the valve seat 44 with a resulting portion of hydraulic flow diverted to the reservoir 14 through outlet port 32. Thereby the pressure again equalizes on opposite spool ends 36 and 38 whereupon the spring 60 is effective to close the spool 40 against the seat 44. Thus the device 20 sets the limit for the maximum pressure which can be developed in the hydraulic system.

The valve body 26 also includes a gauge port 66 having a pressure gauge 68 threaded therein and providing a continuous visual pressure reading at which the system operates. Further, a by-pass flow indicator 70 is provided in the device 20 having a gauge plunger 72 with a lower end 74 supported by the valve spool 40 for movement therewith and with an upper end 76 extending from the body 26. The upper end 76 may be provided with calibrations 77 which become externally readable in relation to a corresponding flow volume diverted to the reservoir 44. Thus, the pressure gauge 68 and by-pass flow indicator 70 provide a continuous means of monitoring the entire hydraulic system and can be utilized to check for failures in individual hydraulic components as will be described.

In some instances where it is desirable that the calibrations 77 be more readily observable a flow indicating needle 78 is provided to give expanded readings on a gauge face 79 as best seen in FIG. 5. Herein, the needle 78 is responsive to movement of the upper end 76 of the plunger 72 to provide an expanded indication as to the volume of hydraulic flow being diverted from the pressure portion of the system back to the reservoir 14.

As shown in FIGS. 1 and 2, the relief valve and trouble shooting device 20 is provided with a simple two-way blocking valve 80 preferably comprising a simple two-way globe valve at the outlet pressure port 30 which in normal operation is kept open, allowing free flow therethrough to a pressure line 82. As shown in FIG. 1 branch pressure lines 84, 85 and 86 are connected between the pressure line 82 and valves 88, 89 and 90. Valve 88 is shown as a four-way valve for control of a cylinder 92. Valve 89 is shown as a four-way valve for control of a reversible hydraulic motor 94 and valve 90 is shown as a pressure reducing valve arranged to supply hydraulic fluid at reduced pressure to another portion of the system, not detailed.

It will be seen that each of these components is provided with its own simple blocking valve 95, 96, 97, 98 and 99.

Obvious actual hydraulic *components* or combinations of components utilized will be in accordance with the requirements of specific machines upon which the system is to be used, and FIG. 1 merely depicts (in simplified form) one possible arrangement of a hydraulic system suited to the present invention.

Hydraulic mechanisms are precision units and their continued satisfactory operation is dependent on proper care; however, despite all precautions improper operation or "break downs" do occur from time to time which in the past have often been difficult to locate. When a malfunction does occur, which may be caused by such problems as: foreign substances in the oil, mechanical damage, internal or external leakage, insufficient oil in the system, improper adjustments, sticking spools, or other difficulties, the pressure gauge 68 and flow indicator 70 will enable a machine operator to quickly recognize the problem. After improper pressure or flow readings are observed, the blocking valve 80 of the relief valve and trouble shooting device 20 is closed shutting off all flow to the system with the flow accordingly diverted to the reservoir 14.

If the by-pass flow indicator shows insufficient flow of hydraulic fluid diverted to the reservoir 14 (below the pump output rating) and leakage is not evident, it is apparent the problem is in the vicinity of the hydraulic pump 12. If after the oil level, filter element 24 and pump speed are checked and found to be satisfactory and the pump still does not produce an output volume in accordance with its rated capacity it can be determined that the pump, itself is at fault and should be replaced. Variable volume pumps should be checked when operated at a full rated capacity output. If on the other hand the rated output volume is produced but the pressure is not up to the relief setting or the pressure fluctuates excessively, the problem can then be identified with the device 20. Herein, as often happens, dirt, scale, or metal shavings or the like 100 may obstruct a passage or cause improper seating between the cone 50 and the seat 52 (see FIG. 4). Sometimes these foreign substances can be purged from the valve by backing off the screw adjustment 46, to allow the dirt 100 to be "washed" clear. Frequently, however, it is necessary to dismantel the device 20 to correct the trouble. If, however, a suitable pressure and flow volume are observed which indicate that the pump and device 20 are functioning properly the blocking valve 80 is opened and the blocking valve 95 for the four-way valve 88 is closed. This accordingly stops all flow to the valve 88 and cylinder 92 in the branch pressure line 84.

If it is then determined that the pressure and volume flow readings are appropriate it is then known the malfunction is in the branch pressure line 84 either with the valve 88 or cylinder 92. Obviously, when making these readings, appropriate measures must be taken, if required, to prevent normal flows back to tank as may be as provided for in some systems. If it is found after opening blocking valve 95 and closing blocking valve 96 that the readings of pressure and by-pass valves are not at normal levels then it will be known the valve 88 is faulty. If, however, the pressure developed in the system is equal to the relief valve setting and the rated output value of the pump is being delivered to the reservoir 14, the problem is then known to reside in the cylinder 92. It is of course advisable to check the valve in its several operating positions.

It may be seen in FIG. 1 that since blocking valve 96 blocks flow to or from cylinder 92 no flow will occur in the branch line 84 if the valve 88 is functioning correctly and no leakage is present in the valve.

The cylinder 92 may be checked by opening blocking valve 96 and pressurizing one side of cylinder 92 by actuating the valve 88 to move piston 102 to a maximum shifted position. Thereafter, with continued pressure directed to the side of the cylinder, internal leakage past the piston 102 back to tank will become evident by reduced flow and reduced pressure readings observed at the device 20.

Accordingly, in a like manner the other branch lines with the hydraulic components used therein may be checked in a similar manner. Thus, by merely alternately closing off portions of the system and reading pressure and flow valves, a positive identification of a defective component can be made for repair or replace.

Figure 6:
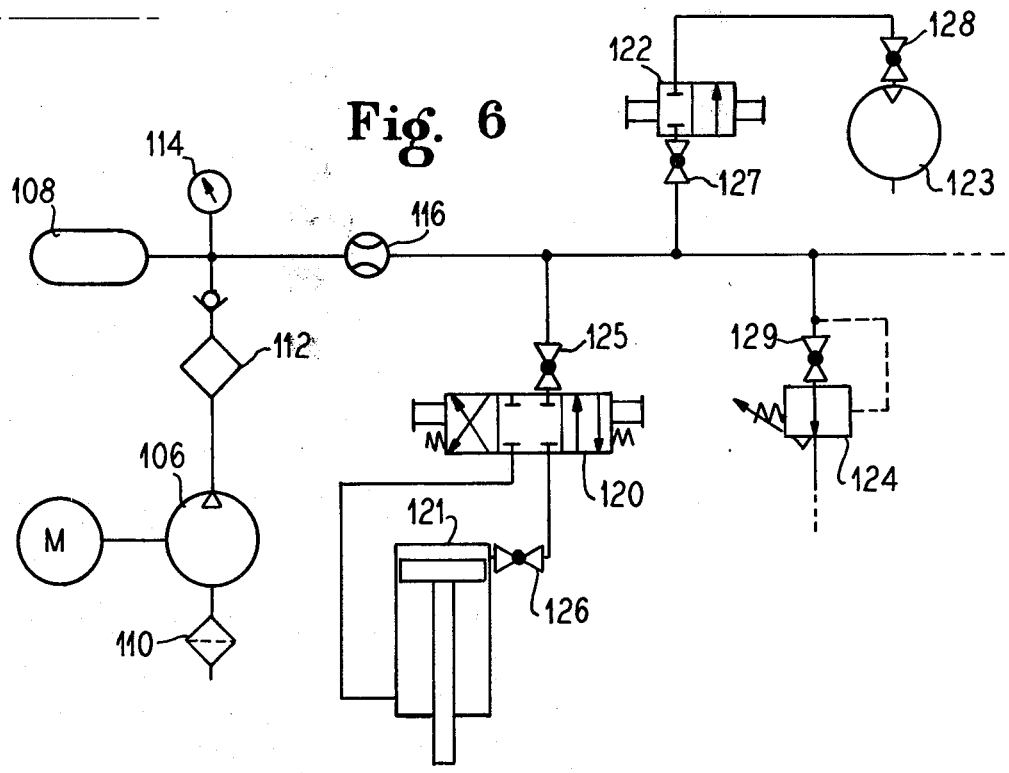
FIG. 6 is a schematic circuit diagram showing the fault detecting apparatus of this invention utilized with a pneumatic pressure system.

With reference to FIG. 6 it will be seen that a similar fault detecting apparatus can be adapted to a pneumatic system to function in a similar manner to the FIG. 1 embodiment. A compressor 106 is arranged to maintain a predetermined pressure in accumulator 108. Suitable fluid conditioners 110 and 112 are provided to keep the air flow through the system as clean as possible. A pressure gauge 114 similar in function to the gauge 68 provides a pressure monitoring means and a flow meter 116 provides a flow rate check of the system.

Also similar to the FIG. 1 embodiment each pneumatic component 120, 121, 122, 123, and 124 used in the system is individually provided with a simple two way blocking valve 125, 126, 127, 128 and 129 respectively. Thus each branch of the system along with the components therein may be watched for a malfunction in a manner somewhat similar to that described relative to the FIG. 1 embodiment.

Herein, the flow indicator 116 instead of reading fluid diverted to tank as in a hydraulic system is arranged to detect flow (leakage) in pneumatic system when the system is in a pressurized static condition with none of the pneumatic components functioning. The seriousness of the problem observed is generally directly proportional to pressure drops and leakage flow measured by the pressure and flow indicators 114 and 116 respectively. Thus with the present invention even relatively minor malfunctions can be detected and corrected before serious trouble develops.

Although the teachings of my invention have been herein discussed with reference to specific embodiments and fault checking procedures, it is to be understood that these are by way of illustration only and that others may wish to utilize my invention in various different applications or methods.

I claim:

1. A fault detecting apparatus for fluid pressure operated systems providing means to identify a malfunction in at least one component in the fluid pressure operated system comprising:

a fluid pressure operated system having motion producing means included therein, a fluid pressure source adapted to pressurize said fluid pressure operated system to operate the motion producing means, fluid control means for a related motion producing means included in the fluid pressure operated system to regulate said motion producing means, separate fluid blocking valves provided with each of said fluid control means and said motion producing means to selectively isolate a related motion producing means from the remainder of the fluid pressure operated system, a pressure indicating means incorporated in the fluid pressure operated system, and a flow indicating means incorporated in the fluid pressure operated system whereby each of the motion producing means and fluid control means may be individually checked for malfunction by alternately operating an associated fluid blocking valve and observing the pressure and flow indicating means for fault indications.

2. The apparatus according to claim 1, wherein the fluid pressure operated system comprises a hydraulic system having a pressure relief valve and a reservoir included therein and wherein said flow indicating means is incorporated in said pressure relief valve.

3. The apparatus according to claim 2, wherein said pressure relief valve includes a movable valve spool to divert fluid from the fluid pressure operated system to the reservoir when pressure in the system exceeds a predetermined value and wherein said flow indicating means includes a plunger movable with said valve spool to indicate when a flow of fluid is diverted to the reservoir.

4. The apparatus according to claim 3, wherein said plunger includes a first end carried by said valve spool and a second end having graduated calibrations thereon which are readable to indicate the volume of fluid diverted to the reservoir.

5. The apparatus according to claim 3, wherein said flow indicating means includes a flow gauge with expanded calibrations thereon being activated by said plunger to provided expanded readings of the volume of fluid diverted to the reservoir.

6. The apparatus according to claim 1, wherein the fluid pressure operated system comprises a pneumatic system.

7. A relief valve and fault detecting apparatus for use with a hydraulic pressure operated system to test individual components in the hydraulic pressure operated system comprising:

a balanced spool-type relief valve having a valve body with pressure inlet and pressure outlet ponts and a drain outlet port and also having a movable valve spool providing flow communications between said pressure inlet port and said drain outlet port at a predetermined pressure relief setting of the relief valve, a flow indicating means including a plunger with a first end supported for movement with said movable valve spool and with a second end extending from said valve body and arranged to indicate the movement of the valve spool and a blocking valve adapted to close said outlet port and effect movement of said valve spool by pressure from said pressure inlet, to detect a fault in the hydraulic operating system in which the fault detecting apparatus is incorporated.

8. The relief valve and fault detecting apparatus according to claim 7, wherein the second end of said plunger is provided with graduated calibrations which are readable to indicate a volume of flow to the outlet port corresponding to a related proportional movement of the valve spool.

9. The relief valve and fault detecting apparatus according to claim 8, wherein a pressure indicating means is incorporated in said valve body for continuously monitoring relief valve pressures.

* * * * *